United States Patent [19]

Mori et al.

[11] 4,323,663

[45] Apr. 6, 1982

[54] PROCESS FOR PRODUCING A HALOGEN-CONTAINING POLYCARBONATE RESIN

[75] Inventors: Hazime Mori; Katsuhisa Kohyama; Katsuhiko Nakamura, all of Kitakyushu, Japan

[73] Assignee: Mitsubishi Chemical Industries, Ltd., Tokyo, Japan

[21] Appl. No.: 203,649

[22] Filed: Nov. 3, 1980

[30] Foreign Application Priority Data

Nov. 20, 1979 [JP] Japan ................. 54-150254

[51] Int. Cl.³ ............. C08L 69/00; C08G 63/62
[52] U.S. Cl. ................. 525/470; 525/469; 528/499
[58] Field of Search ................. 525/470, 469

[56] References Cited

U.S. PATENT DOCUMENTS

| | | | |
|---|---|---|---|
| 3,038,874 | 6/1962 | Laakso et al. | 525/470 |
| 3,334,154 | 8/1967 | Kim | 525/470 |
| 3,890,266 | 6/1975 | Serini et al. | 525/470 |

*Primary Examiner*—Wilbert J. Briggs, Sr.
*Attorney, Agent, or Firm*—Kenway & Jenney

[57] ABSTRACT

A process for producing a halogen-containing polycarbonate resin characterized by washing, with an aqueous washing liquid, an organic solvent solution of a mixture of a halogen-containing polycarbonate resin having a halogen content of not less than 4 wt % (hereinafter referred to simply as polycarbonate H) and a polycarbonate resin having a halogen content of not larger than 4 wt % (hereinafter referred to simply as polycarbonate P) the weight ratio of polycarbonate P to polycarbonate H being 0.05-4, and collecting a mixed polycarbonate resin having a halogen content of not less than 4 wt % from said solution.

9 Claims, No Drawings

PROCESS FOR PRODUCING A HALOGEN-CONTAINING POLYCARBONATE RESIN

BACKGROUND OF THE INVENTION

1. Field of the Invention

This invention relates to a process for producing a halogen-containing polycarbonate resin. More particularly, it relates to a process for producing a halogen-containing polycarbonate resin in which washability of an organic solvent solution of the halogen-containing polycarbonate resin obtained by the phosgene method is improved. The polycarbonate resin which has a reduced content of impurities, is inflammable and has excellent melt flowability.

2. The Prior Art

Known processes of producing a halogen-containing polycarbonate resin by the phosgene method include:

(1) A process in which a mixture of a halogenated bisphenol and bisphenol A, and phosgene are reacted to directly give a resin (U.S. Pat. No. 3,062,781); and (2) A process in which a polychloroformate (oligomer) prepared from bisphenol A and a halogenated bisphenol A are reacted to obtain a resin of high molecular weight (Japanese Patent Publication No. 38-7147).

In the preparation of halogenated polycarbonate resins by such a phosgene method, it is the general practice to wash an organic solvent solution of the resin obtained by polymerization with an aqueous medium such as water or an aqueous acid solution so as to purify the resin, and to pulverize and concentrate the resin. When it is desired to produce, by the known method, a polycarbonate resin containing a halogen in an amount required for the flame retarding purpose or in a relatively large amount, say, above 4 wt%, the organic solvent solution of a resin obtained by the polymerization reaction is much more difficult to wash and to pulverize and concentrate, as compared with a case where bisphenol A alone is used as a starting material. The thus obtained polycarbonate resin having a large content of halogen has a further disadvantage that it is lower in melt fluidity than a polycarbonate resin obtained from a starting material of bisphenol A alone.

For instance, when a solution, in methylene chloride, of 10 wt% of a polycarbonate resin having a bromine content of above 4 wt%, which has been obtained by reacting tetrabromobisphenol A and bisphenol A with a polycarbonate oligomer by the foregoing process (2), is washed on an industrial scale, several disadvantages result: (1) An emulsion is formed and thus an organic solvent solution of the resin is not separated from the aqueous washing; (2) Even though separation takes place, a large amount of a dirt layer is formed and thus the washing efficiency is too poor to remove impurities satisfactorily, so that the resulting resin is poor in color tone and also in thermal stability; and (3) upon concentrating and powdering, a viscous gel-like material is produced which is hard to powder, making it difficult to produce a particulate material on an industrial scale.

SUMMARY OF THE INVENTION

The present inventors have made an intensive study to overcome the above-mentioned disadvantages involved in the production of a polycarbonate resin containing a large amount of halogen and, as a result, found that when an organic solvent solution of a polycarbonate resin having a large content of a halogen also contains, dissolved therein, a polycarbonate resin having a halogen content not greater than 4 wt% is subjected to washing, the washability of the solution is remarkably improved even though the total halogen content based on the total amount of the polycarbonate resins in the solution is large, that the pulverization with concentration is made easier, and that the obtained resin has a good melt fluidity.

Thus, the present invention has for its object the provision of an industrially advantageous process for producing a halogen-containing polycarbonate resin. This object can be achieved by a process which comprises washing, with an aqueous medium, an organic solvent solution of a mixture of (1) a halogen-containing polycarbonate resin having a halogen content of not less than 4 wt% and (2) a polycarbonate resin having a halogen content not greater than 4 wt% and present in an amount 0.05–4 times the weight of resin (1), and collecting, as the washed product, a mixed polycarbonate resin having a halogen content of not less than 4 wt% from the mixed solution.

DESCRIPTION OF THE PREFERRED EMBODIMENTS

The halogen-containing polycarbonate resin having a halogen content not less than 4 wt% (hereinafter referred to simply as polycarbonate H) used in the invention is prepared by reacting a halogenated bisphenol A or a halogenated bisphenol A and bisphenol A and phosgene by an interfacial polymerization in the presence of an organic solvent, water and an acid binder or by a solution polymerization in the presence of an organic solvent and an acid binder according to a conventional phosgene method for producing a polycarbonate resin.

For example, the polymerization may be carried out by introducing phosgene into a halogenated bisphenol A alone or in admixture with bisphenol A in accordance with the previously mentioned method (1) or by reacting bisphenol A and phosgene to prepare an oligomer and then adding to the oligomer a halogenated bisphenol A alone or in admixture with bisphenol A in accordance with the above method (2).

The halogenated bisphenol A used as a starting material is one which has a halogen atom such as chlorine, bromine or the like joined to the benzene nucleus of bis-phenol A and may be, for example, 2,2-bis(4-hydroxy-3,5-dibromophenyl)-propane(tetrabromobisphenol A), 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-2,3,5-tribromophenyl)propane, 2,2-bis(4-hydroxy-2,3,5-trichlorophenyl)-propane, 2,2-bis(4-hydroxy-2,3,5,6-tetrabromophenyl)propane, 2,2-bis(4-hydroxy-2,3,5,6-tetrachlorophenyl)propane and the like.

Examples of the organic solvent include methylene chloride, chloroform, carbon tetrachloride, 1,2-dichloro-ethane, 1,1,2-trichloroethane, tetrachloroethane, chlorobenzene and mixtures thereof.

Examples of the acid binder include caustic alkalis such as sodium hydroxide, potassium hydroxide and the like, and organic bases such as pyridine.

The polycarbonate H prepared by the polymerization reaction is preferred to have a reduced viscosity of 0.26–1.0, preferably 0.38–0.80. Too small a reduced viscosity results in a low mechanical strength, while too large a reduced viscosities results in poor melt fluidity, leading to deteriorated processability.

It is sufficient that the halogen content of the polycarbonate H be not less than 4 wt%. In the practice of the invention, the polycarbonate H is admixed with a polycarbonate having a halogen content of not greater than 4 wt% and thus the halogen content in the polycarbonate is diluted, so that the halogen content is preferably predetermined in consideration of such a dilution. Thus, the halogen content of polycarbonate H is generally in the range of 4–50 wt%, preferably 7–40 wt%.

The polycarbonate resin having a halogen content not greater than 4 wt% (hereinafter referred to simply as polycarbonate P) may be, for example, a halogen-free polycarbonate resin which is prepared from bis-phenol A by a known method, or a polycarbonate resin having a halogen content of not greater than 4 wt% which is prepared from bisphenol A with a small amount of a halogenated bisphenol A added as previously described. The polycarbonate P has a reduced viscosity in the range of 0.26–1.0, preferably 0.38–0.80.

In the practice of the invention, a solution of a mixture of the polycarbonate H and the polycarbonate P in an organic solvent (hereinafter referred to simply as a mixed polycarbonate solution) is prepared and washed with an aqueous medium.

The mixed polycarbonate solution can be prepared by adding the polycarbonate P at any time during the course of preparing the halogen-containing polycarbonate before washing. For instance, the polycarbonate P may be added to an organic solvent solution of the polycarbonate H obtained by the polymerization reaction, or may be added to the initial stage of or during the polymerization of the polycarbonate H since the polycarbonate P itself does neither changes in quality nor impedes the reaction when introduced into a polymerization system for producing the halogen-containing polycarbonate.

Though the polycarbonate P may be used in the form of flakes or after having been dissolved in an organic solvent, it is industrially convenient to use the organic solvent solution obtained by the phosgene method as is.

The amount of the polycarbonate P is suitably determined in consideration of a halogen content of the polycarbonate H used and is generally in the range of 0.05–4 times in weight, preferably 0.05–2 times in weight, and most preferably 0.1–1 time in weight the polycarbonate H. Much smaller amounts are disadvantageous in that the improved effect of the invention can not be expected. On the other hand, much larger amounts, while not inconvenient with respect to the washing and subsequent concentrating and powdering procedures, are unfavorable since a mixed polycarbonate with a sufficiently high halogen content can not be obtained. The halogen content of the mixed polycarbonate product should be above 4 wt%, preferably above 6 wt%.

The thus prepared mixed polycarbonate solution is washed with an aqueous medium such as water or an aqueous acid solution. The washing is conducted by mixing both solutions to allow them to contact sufficiently and separating the mixture into two phases according to conventional practice for washing a polycarbonate solution. In general, the above procedure is repeated several times. The weight ratio of the aqueous or water phase (weight of the water phase/weight of the mixed polycarbonate solution phase) in the washing is in the range of 0.1–1.5, preferably 0.2–0.5.

The concentration of the mixed polycarbonate in the mixed polycarbonate solution is in the range of 3–20 wt%, preferably 5–15 wt%. If necessary, an organic solvent is added to the solution to adjust its concentration to a desired level.

The mixed polycarbonate solution which has been washed is subsequently treated to evaporate the organic solvent therefrom thereby collecting the mixed polycarbonate. Industrially, the mixed polycarbonate is pulverized, for example, in a kneader while concentrating, thereby obtaining a powder of the mixed polycarbonate. According to the process of the invention, even though the halogen content of the mixed polycarbonate is high, the solution can be easily washed and thus impurities can be sufficiently removed, and the solution can be easily pulverized with concentration, so that a halogen-containing polycarbonate of high purity can be produced industrially in a favorable manner. In addition, the resin product has good melt fluidity. Especially when a polycarbonate having a halogen content of above 6 wt% is produced, the process of the invention is much more advantageous than previously known processes.

The present invention will be further described by way of examples, which should not be construed as limiting the invention. In the following examples, "parts" and "%" mean "parts by weight" and "% by weight", respectively.

PREPARATORY EXAMPLE 1

(Production of Halogen-free Polycarbonate Resin)

42 parts of an aqueous alkali solution of 13.5% bisphenol A prepared by dissolving bisphenol A in a 5.5% caustic soda aqueous solution and 23 parts of methylene chloride were admixed and agitated to form an emulsion-like mixture, to which was gradually added 3.6 parts of phosgene for reaction at 10°–20° C. to obtain a methylene chloride solution of a polycarbonate oligomer having an oligomer concentration of 28.5% and having 1950 μeq of the chloroformate group/g of the oligomer and 67 μeq of the hydroxyl group/g of the oligomer.

Then, 100 parts of the oligomer solution, 50 parts of an aqueous alkali solution of bisphenol A (BPA), 100 parts of methylene chloride, 0.6 parts of p-tertiary-butylphenol, and 0.02 parts of triethylamine were charged into agitation vessel, in which the polymerization reaction was conducted for 30 minutes under agitation.

After completion of the reaction, the water phase was separated to obtain a methylene chloride solution containing 15% of a halogen-free polycarbonate resin whose $\eta_{sp}/C$ was 0.52.

PREPARATORY EXAMPLE 2

(Preparation of Polycarbonate having a Bromine Content of 1.8%)

250 parts of the oligomer solution obtained in Preparatory Example 1, 9 parts of an aqueous alkali solution of 27% tetrabromobisphenol A prepared by dissolving tetrabromobisphenol A in a 5.5% caustic soda aqueous solution, 500 parts of methylene chloride, 1.7 parts of p-tertiary-butylphenol and 0.08 parts of triethylamine were charged into an agitation vessel, in which the polymerization reaction was conducted for 30 minutes under agitation. Thereafter, 130 parts of an alkali aqueous solution of BPA as used in Preparatory Example 1 was further added to the reaction solution, followed by further polymerization for an additional hour to obtain a methylene chloride solution containing 10% of a polycarbonate resin having a bromine content of 1.8% and a $\eta_{sp}/C$ of 0.51

EXAMPLE 1

250 parts of the oligomer solution obtained in Preparatory Example 1, 130 parts of an alkali aqueous solution of tetrabromobisphenol A as used in Preparatory Example 2, 300 parts of methylene chloride, 2.3 parts of p-tertiary-butylphenol and 0.03 parts of triethylamine were charged into an agitation vessel in which the polymerization reaction was conducted for 30 minutes under agitation. Thereafter, 40 parts of an aqueous alkali solution of bisphenol A as used in Preparatory Example 1 was added to the reaction system and the a polymerization reaction was continued for an additional hour to obtain a methylene chloride solution containing 18% of a polycarbonate resin which had a $\eta_{sp}/C$ of 0.51 and a bromine content of 18%.

To 420 parts of the methylene chloride solution of the polycarbonate resin was added 780 parts of the methylene chloride solution of a polycarbonate resin having a bromine content of 1.8% which had been prepared in Preparatory Example 2, to which was further added methylene chloride so that the concentration of the mixed polycarbonate resins in the methylene chloride was 10%, followed by mixing under agitation (polycarbonate P/polycarbonate H=1.03).

The methylene chloride solution of the mixed polycarbonate was washed five times under the conditions indicated in Table 1 with agitation and then allowed to stand for phase separation. After completion of the washing, the moisture content of each methylene chloride solution was measured.

TABLE 1

| Washing step | Mixing under agitation | | | Separation at standing | | Moisture content in methylene chloride solution (%) |
|---|---|---|---|---|---|---|
| | Aqueous washing | Water phase ratio | Time (min) | Time (min) | State of separation | |
| 1 | Water | 0.6 | 5 | 10 | Good | 1.49 |
| 2 | Water | 0.3 | 5 | 10 | Good | 0.82 |
| 3 | 0.1N hydrochloric acid | 0.3 | 5 | 10 | Good | 0.40 |
| 4 | Water | 0.3 | 5 | 10 | Good | 0.22 |
| 5 | Water | 0.3 | 5 | 10 | Good | 0.24 |

The methylene chloride solution of the mixed polycarbonate which had been thus washed was introduced into a jacketed, double-armed, horizontal mixer where it was pulverized and concentrated.

The mixer was charged with 1 kg of a polycarbonate powder separately prepared and with 30 kg/hr of the methylene chloride solution of the mixed polycarbonate and heated by passing hot water at 80° C. through the jacket and agitating. The methylene chloride was evaporated during pulverization.

The resulting mixed polycarbonate was in the form of spheres of 1-3 mm in size having a bulk density of 0.76 g/ml, a $\eta_{sp}/C$ of 0.51 and a bromine content of 9.8%. The mixed resin had a residual amount of bisphenol A of 710 ppm and was satisfactory for continuous feeding into the extruder.

EXAMPLE 2

200 parts of the methylene chloride solution of the polycarbonate resin having a bromine content of 18% which had been prepared in Example 1 and 600 parts of the methylene chloride solution of the halogen-free poly-carbonate resin prepared in Preparatory Example 1 were mixed, and methylene chloride was added so that the concentration of the mixed polycarbonate in the methylene chloride solution was 10%, and the whole was mixed by agitation. The solution had a polycarbonate P/polycarbonate H ratio of 2.50.

The methylene chloride solution of the mixed polycarbonate was washed in a manner similar to Example 1, and the moisture content in the methylene chloride solution after completion of the washing was found to be as shown in Table 2 below.

TABLE 2

| Washing step | Mixing under agitation | | | Separation at standing | | Moisture content in methylene chloride solution (%) |
|---|---|---|---|---|---|---|
| | Aqueous washing | Water phase ratio | Time (min) | Time (min) | State of separation | |
| 1 | Water | 0.3 | 5 | 10 | Good | 1.01 |
| 2 | Water | 0.3 | 5 | 10 | Good | 0.60 |
| 3 | 0.1N hydrochloric acid | 0.3 | 5 | 10 | Good | 0.29 |
| 4 | Water | 0.3 | 5 | 10 | Good | 0.23 |
| 5 | Water | 0.3 | 5 | 10 | Good | 0.25 |

The thus washed methylene chloride solution of the mixed polycarbonate was pulverized and concentrated, similar to Example 1.

The resulting mixed polycarbonate had a $\eta_{sp}/C$ of 0.52 and a bromine content of 5.2%, and the residual amount of bisphenol A was 400 ppm. The mixed polycarbonate was satisfactorily fed through an extruder.

EXAMPLE 3

195 parts of the oligomer solution obtained in Preparatory Example 1, 150 parts of an aqueous alkali solution of tetrabromobisphenol A as used in Preparatory Example 2, 250 parts of methylene chloride, 1.3 parts of p-tertiary-butylphenol, 0.1 part of triethylamine, and 50 parts of an aqueous alkali solution of bisphenol A as used in Preparatory Example 1 were used to effect the same polymerization reaction as in Example 1, thereby obtaining a methylene chloride solution containing 20% of a polycarbonate resin which had a $\eta_{sp}/C$ of 0.56 and a bromine content of 24%.

To 350 parts of the methylene chloride solution of the polycarbonate resin was added 1000 parts of the methylene chloride solution of the halogen-free polycarbonate resin obtained in Preparatory Example 1 and a sufficient amount of methylene chloride to adjust the concentration of the mixed polycarbonate in the methylene chloride solution to 10%, followed by mixing under agitation. The solution had a polycarbonate P/polycarbonate H ratio of 2.14.

The methylene chloride solution of the mixed polycarbonate was washed in the same manner as in Example 1 and the moisture content in the methylene chloride solution after completion of each step was as shown in Table 3 below.

TABLE 3

| Washing step | Aqueous washing | Mixing under agitation Water phase ratio | Time (min) | Separation at standing Time (min) | State of separation | Moisture content in methylene chloride solution (%) |
|---|---|---|---|---|---|---|
| 1 | Water | 0.3 | 5 | 10 | Good | 1.45 |
| 2 | Water | 0.3 | 5 | 10 | Good | 0.69 |
| 3 | 0.1N hydrochloric acid | 0.3 | 5 | 10 | Good | 0.30 |
| 4 | Water | 0.3 | 5 | 10 | Good | 0.35 |
| 5 | Water | 0.3 | 5 | 10 | Good | 0.24 |

The methylene chloride solution of the thus washed mixed polycarbonate was easily pulverized and concentrated as in Example 1.

The resulting mixed polycarbonate had a $\eta_{sp}/C$ of 0.53 and a bromine content of 7.6%, and the residual amount of bisphenol A was 640 ppm. The mixed resin was satisfactorily fed through an extruder.

EXAMPLE 4

780 parts of the methylene chloride solution of the polycarbonate resin having a bromine content of 1.8% which had been prepared in Preparatory Example 2, 178 parts of the oligomer solution obtained in Preparatory Example 1, 92.6 parts of an alkali aqueous solution of tetrabromobisphenol A as used in Preparatory Example 2, 213 parts of methylene chloride, 1.3 parts of p-tertiary-butylphenol, and 0.02 parts of triethylamine were mixed, and polymerized with agitation for 30 minutes. Thereafter 29.6 parts of an alkali aqueous solution of bisphenol A was added to the reaction system and the polymerization reaction continued for 1 hour, thereby obtaining a methylene chloride solution of a mixture of the polycarbonate resin having a bromine content of 1.8% and a polycarbonate resin having a bromine content of 18% with a polycarbonate P/polycarbonate H ratio of 1.03.

To the methylene chloride solution of the mixed polycarbonate was added methylene chloride so that the polymer content was 10%, followed by washing in the same manner as in Example 1. The results are shown in Table 4 below.

TABLE 4

| Washing step | Aqueous washing | Mixing under agitation Water phase ratio | Time (min) | Separation at standing Time (min) | State of separation | Moisture content in methylene chloride solution (%) |
|---|---|---|---|---|---|---|
| 1 | Water | 0.3 | 3 | 10 | Good | 1.21 |
| 2 | Water | 0.3 | 5 | 10 | Good | 0.71 |
| 3 | 0.1N hydrochloric acid | 0.3 | 5 | 10 | Good | 0.48 |
| 4 | Water | 0.3 | 5 | 10 | Good | 0.26 |
| 5 | Water | 0.3 | 5 | 10 | Good | 0.22 |

The thus obtained methylene chloride solution of the mixed polycarbonate was found to be easily pulverized and concentrated, similar to Example 1.

The resulting mixed polycarbonate had a $\eta_{sp}/C$ of 0.51 and a bromine content of 9.8%, and the residual content of bisphenol A was 600 ppm. The resin was satisfactorily fed through an extruder.

COMPARATIVE EXAMPLE 400 parts of the oligomer solution obtained in Preparatory Example 1, 50 parts of an alkali aqueous solution of tetrabromobisphenol A as used in Preparatory Example 2, 96 parts of an alkali aqueous solution of bis-phenol A as used in Preparatory Example 1, 240 parts of methylene chloride, 2.2 parts of p-tertiary-butylphenol, and 0.04 parts of triethylamine were charged into an agitation vessel and reacted for 30 minutes under agitation. Thereafter 30 parts of an alkali aqueous solution of bisphenol A as used in Preparatory Example 1 was further added to the reaction system, followed by a polymerization for an additional 1 hour to obtain a methylene chloride solution of a halogen-containing polycarbonate. Then, methylene chloride was added to the solution so that the polymer concentration was 10%, followed by washing in the same manner as in Example 1. The results are shown in Table 5 below.

TABLE 5

| Washing step | Aqueous washing | Mixing under agitation Water phase ratio | Time (min) | Separation at standing Time (min) | State of separation | Moisture content in methylene chloride solution (%) |
|---|---|---|---|---|---|---|
| 1 | Water | 0.3 | 5 | 30 | Interface was not yet clear in 10 min. and a dirt layer was observed. | 8.3 |
| 2 | Water | 0.3 | 5 | 30 | Interface was not yet clear, in 10 min. and a dirt layer was observed. | 4.5 |
| 3 | 0.1N hydrochloric acid | 0.3 | 5 | 30 | Polymer solution had a slight degree of turbidity | 2.6 |
| 4 | Water | 0.3 | 5 | 30 | Polymer solution had a slight degree of turbidity. | 0.5 |
| 5 | Water | 0.3 | 5 | 30 | Polymer solution had a slight degree of | 0.3 |

TABLE 5-continued

| Washing step | Mixing under agitation | | | Separation at standing | | Moisture content in methylene chloride solution (%) |
| --- | --- | --- | --- | --- | --- | --- |
| | Aqueous washing | Water phase ratio | Time (min) | Time (min) | State of separation | |
| | | | | | turbidity. | |

When an attempt was made to pulverize the thus washed halogen-containing polycarbonate solution, pulverized with concentration. The results are shown in Table 6 below.

TABLE 6

| | | | Example 5 | Example 6 | Example 7 |
| --- | --- | --- | --- | --- | --- |
| Polymerization | Methylene chloride solution of halogen-free polycarbonate | (parts) | 67 | 400 | 600 |
| | Oligomer solution | (parts) | 270 | 240 | 195 |
| | Alkali solution of TBBPA | (parts) | 75 | 110 | 150 |
| | Alkali solution of BPA | (parts) | 125 | 150 | 50 |
| | Methylene chloride | (parts) | 250 | 220 | 100 |
| | p-Tertiary-butylphenol | (parts) | 2.0 | 1.2 | 1.3 |
| | Triethylamine | (parts) | 0.06 | 0.1 | 0.1 |
| Moisture Content after washing (%) | Step 1, water | | 1.01 | 0.96 | 1.21 |
| | Step 2, water | | 0.66 | 0.61 | 0.73 |
| | Step 3, 0.1N HCl | | 0.46 | 0.30 | 0.51 |
| | Step 4, water | | 0.22 | 0.23 | 0.26 |
| | Step 5, water | | 0.23 | 0.21 | 0.24 |
| | Concentration and powdering | | easy | easy | easy |
| | Bulk density | (g/ml) | 0.70 | 0.73 | 0.76 |
| | Particle size | (mm) | 1-3 | 1-3 | 1-3 |
| | $\eta_{sp}/C$ | | 0.49 | 0.60 | 0.56 |
| Product | Bromine content | (%) | 9.8 | 10.4 | 12.5 |
| | Residual amount of bisphenol A | (ppm) | 440 | 380 | 630 |
| | Feeding through extruder | | good | good | good |
| | Polycarbonate P/Polycarbonate H | | 0.09 | 0.53 | 0.92 | with concentration in the same manner as in Example 1, it was found that the polymer was impossible to powder when it was charged at a rate of 30 kg/hr into a mixer and a block of a great size was formed, making the operation impossible.

When the rate of charge to the mixer was lowered to 15 kg/hr, the operation became possible but the resulting polymer had a bulk density of 0.50 g/ml, a particle size of 3-10 mm, thus being very irregular in size, a $\eta_{sp}/C$ of 0.49, and a bromine content of 7.2%. The residual content of bisphenol A was 4200 ppm and the polymer was difficult to feed through an extruder.

When the above procedure was repeated using an increasing amount of the alkali aqueous solution of tetrabromobisphenol A as used in Preparatory Example 2 so as to prepare a solution of a halogen-containing polycarbonate having a bromine content of 9.8% and the solution was subjected to washing similar to the above procedure, the solution did not separate from the aqueous phase and thus could not be washed.

EXAMPLES 5-7

The methylene chloride solution of the polycarbonate resin obtained in Preparatory Example 1, an alkali aqueous solution of bisphenol A as used in Preparatory Example 1, an alkali aqueous solution of tetrabromobisphenol A as used in Preparatory Example 1, methylene chloride, p-tertiarybutylphenol, and triethylamine were mixed in the amounts indicated in Table 6 below, respectively, and polymerized in the same manner as in Example 2 to obtain a methylene chloride solution of a mixed polycarbonate. The solution was washed and

What is claimed is:

1. A process for producing a halogen-containing polycarbonate resin characterized by washing, with an aqueous washing liquid, an organic solvent solution of a mixture of a first halogen-containing polycarbonate resin prepared by a process using phosgene as a reactant, said first polycarbonate resin having a halogen content of not less than 4 wt% and a second polycarbonate resin having a halogen content of not larger than 4 wt% and present in said mixture in an amount 0.05-4 times the weight of said first polycarbonate resin, and collecting a mixed polycarbonate resin having a halogen content of not less than 4 wt% from said solution.

2. A process according to claim 1, characterized in that said second polycarbonate resin is used in an amount 0.05-2 times the weight of said first polycarbonate resin.

3. A process according to claim 1, characterized in that the halogen content of said first polycarbonate resin is in the range of 7-40 wt%.

4. A process according to claim 1, characterized in that the halogen content of the mixed polycarbonate resin is 6 wt% or more.

5. A process according to claim 1, characterized in that the organic solvent is methylene chloride, chloroform, carbon tetrachloride, 1,2-dichloroethane, 1,1,2-trichloroethane, tetrachloroethane or chlorobenzene.

6. A process according to claim 1, characterized in that the concentration of the mixed polycarbonate resin in the organic solvent solution is in the range of 3-20 wt%.

7. A process according to claim 1, characterized in that the ratio by weight of the aqueous washing liquid/the organic solvent solution is in the range of 0.1–1.5.

8. A process according to claim 1, characterized in that the mixed polycarbonate resin is collected by evaporating the organic solvent from the organic solvent solution after the washing.

9. A process according to claim 1 wherein said first polycarbonate resin is produced by:

(1) introducing phosgene into a halogenated bisphenol A alone or in admixture with bisphenol A, or by
(2) reacting bisphenol A and phosgene to prepare an oligomer and then adding to the oligomer a halogenated bisphenol A alone or in admixture with bisphenol A; and wherein said second polycarbonate resin is prepared from (1) bis-phenol A alone or (2) from bisphenol A in combination with a minor amount of a halogenated bisphenol A.

* * * * *